(12) United States Patent
Starko

(10) Patent No.: US 7,908,174 B2
(45) Date of Patent: Mar. 15, 2011

(54) ANIMAL IDENTIFICATION BAND GENERATOR APPARATUS AND METHOD

(75) Inventor: Dan G. Starko, Gallatin, TN (US)

(73) Assignee: Idexx Laboratories, Inc., Westbrook, ME (US)

( * ) Notice: Subject to any disclaimer, the term of this patent is extended or adjusted under 35 U.S.C. 154(b) by 1092 days.

(21) Appl. No.: 11/305,059

(22) Filed: Dec. 17, 2005

(65) Prior Publication Data

US 2007/0137587 A1    Jun. 21, 2007

(51) Int. Cl.
  *G06Q 10/00*    (2006.01)
(52) U.S. Cl. .......... 705/26; 707/104.1; 340/573.1; 340/572.1; 702/178; 250/253; 119/859
(58) Field of Classification Search .......... 707/104.1; 705/26; 340/573.1; 119/859
See application file for complete search history.

(56) References Cited

U.S. PATENT DOCUMENTS

| | | | |
|---|---|---|---|
| 4,956,931 A | 9/1990 | Selke | 40/633 |
| 5,036,610 A | 8/1991 | Fehr | 40/300 |
| 5,803,906 A | 9/1998 | Pratt et al. | 600/300 |
| 6,329,918 B1 * | 12/2001 | Moyer | 340/573.1 |
| 6,353,390 B1 | 3/2002 | Beri et al. | 340/572.1 |
| 6,441,778 B1 | 8/2002 | Durst et al. | 342/357.07 |
| 6,547,726 B2 | 4/2003 | Pratt et al. | 600/300 |
| 6,568,354 B1 | 5/2003 | Wasserman et al. | 119/859 |
| 6,577,241 B2 * | 6/2003 | Neidig et al. | 340/573.3 |
| 6,592,517 B2 | 7/2003 | Pratt et al. | 600/300 |
| 6,721,681 B1 | 4/2004 | Christian et al. | 702/178 |
| 6,868,804 B1 | 3/2005 | Huisma et al. | 119/842 |
| 2003/0023517 A1 | 1/2003 | Marsh et al. | 705/28 |
| 2003/0052788 A1 | 3/2003 | Kwong-Tai Chung | 340/573.1 |
| 2003/0204417 A1 | 10/2003 | Mize | 705/2 |
| 2003/0229452 A1 | 12/2003 | Lewis et al. | 702/19 |
| 2004/0036623 A1 | 2/2004 | Chung | 340/825.49 |
| 2004/0150528 A1 | 8/2004 | Natividade et al. | 340/573.3 |
| 2005/0110640 A1 | 5/2005 | Chung | 340/572.1 |
| 2007/0226257 A1 * | 9/2007 | Yarnall, Jr | 707/104.1 |

OTHER PUBLICATIONS

Technical Support, AVImark Veterinary Management System, www.avimark.net/techsupport.html; AVImark User's Manual, pp. 1-1, 1-2, 3, 4, 15-1-15-8, 22-1-22-14, www.avimark.net/manualonline-i.html, 2005.

* cited by examiner

*Primary Examiner* — Vanel Frenel
(74) *Attorney, Agent, or Firm* — Baker Donelson Bearman Caldwell & Berkowitz, PC

(57) ABSTRACT

An animal tracking system integrated with a computerized animal management system operated by a microprocessor that maintains an animal information database of a plurality of animals within the custody of an animal handing facility, veterinary, pet kennel, or other pet care facility, includes an animal label driver that selectively generates an animal identification band having information associated with a selected one of the animals printed by a printer on a first surface with an attacher such as an opposing adhesive surface for attaching to the band in association with the animal. A method for generating an animal identification band by an animal management system is disclosed.

21 Claims, 5 Drawing Sheets

ANIMAL IDENTIFICATION BAND GENERATOR APPARATUS AND METHOD

TECHNICAL FIELD

The present invention relates to apparatus and methods for identification and tracking of animals. More particularly, the present invention relates to apparatus and methods for generating animal identification bands used for tracking of animals at animal handling facilities.

BACKGROUND OF THE INVENTION

People generally love animals as pets. These animals include a wide range of species, including various species of fish, reptiles, and mammals, and particularly cats and dogs. The pet industry includes manufacturers of foods, manufacturers of equipment and supplies for caring for the pets, breeders and collectors providing pets to the trade, retail distributors of such products and animals, and animal handling facilities including veterinarian, pet stores, and animal care and kennel facilities.

In recent years, pet care facilities have expanded significantly offering new services to owners of pets. Facilities known as "dog parks" have been developed. These provide an enclosed field for owners to bring dogs for exercise, running, and play. Other pet care facilities provide overnight or extended-stay services for owners who are traveling and unable to otherwise care for the pets during extended periods. These facilities handle feeding, exercise, grooming, and veterinarian services as required from time to time by owners of pets. Services provided include separate runs or kennels for dogs or group kenneling, when the dog is comfortable with getting along with other animals. Televisions are provided, and the pets may be scheduled for particular exercise and playtime activities.

In addition to these pet care and kennel facilities, veterinary offices receive pets for medical care, grooming, including nail clipping, brushing and styling, and dental services, and kenneling services. The services and the animal need to be correlated, so that the animal receives the services expected by the owner, the owner is charged for the services provided, and the services provided to the animal are not billed to the incorrect owner.

To facilitate the receiving of pets, the providing of services, and the tracking of costs for pet care services, computerized animal management systems have been developed for use at animal care facilities, pet stores, and veterinarian services. These systems provide check-in and check-out of the pet being left with the animal handling facility, as well as tracking of the costs incurred and the services provided by the facility while the pet is within the custody of the facility.

While these facilities provide services needed by owners of pets, and have computer systems for tracking services provided during the stay by the pet at the facility, occasionally one animal is confused for another, exercise or play services may not be provided to the appropriate animal, medicine or medical treatment may be delivered to the incorrect animal, and even a pet is returned to the incorrect owner on occasion. Owners often bring toys, food, medicines, and other accessories when leaving pets at animal handling facilities. The services and care providers also have to keep track of these additional items for use by the pet during the care period and for return with the pet.

Accordingly there is a need in the art for a device integrated with animal management systems for generating animal identification bands that correlate animals and articles belonging to the animal for tracking and control while the animal is in the custody of an animal handling facility. It is to such that the present invention is directed.

SUMMARY OF THE INVENTION

The present invention meets the need in the art by providing a pet animal tracking system for a pet-care facility that provides pet-care grooming and pet-sitting services that integrates with a computerized animal management system for generating animal identification bands for pet animals within the custody of the pet-care facility, comprising an animal management system operated by a microprocessor that maintains an animal information database of information associated with each of a plurality of pet animals within the custody of the pet-care facility. An animal label driver operatively engages to the animal management system for selectively generating an animal identification band for a selected one of the pet animals within the custody of the pet-care facility. The animal identification band comprises a sheet having an information display surface. A printer operated by the animal label driver prints at least an identification code associated with the selected one of the pet animals on the information display surface of the animal identification band. The animal identification band connects with an attacher to itself in a selected position in association with the selected one of the animals during its custody by the pet-care facility and disposable after single-use custody.

In another aspect, the present invention provides a method of tracking a pet animal within the custody of a pet-care facility that provides pet-care grooming and pet-sitting services and having a computerized animal management system with an integrated animal tracking system that generates identification bands for pet animals within the custody of the pet-care facility, comprising the steps of:

(a) providing an animal label driver for an animal management system operated by a microprocessor to maintain an animal information database of a plurality of pet animals within the custody of a pet-care facility;

(b) selectively printing by the animal label driver an animal identification band comprising an elongated sheet having an information display surface printed with at least an identification code from the animal information database associated with a selected one of the pet animals within the custody of the pet-care facility; and (c) attaching the animal identification band to itself in a selected position in association with the selected pet animal for wearing as a collar during its custody by the pet-care facility and disposal after single-use custody.

Objects, advantages and features of the present invention will become apparent from reading of the following detailed description of the invention and claims in view of the appended drawings.

BRIEF DESCRIPTION OF THE DRAWINGS

FIG. 6 is a pet check-in screen in an exemplary embodiment of the animal management system having an integrated animal identification band generator according to the present invention for creating the animal identification band illustrated in FIG. 1.

FIG. 7 is a screen image of a pop-up window for directing the generation of the animal identification band illustrated in FIG. 1.

DETAILED DESCRIPTION

Figure 1:
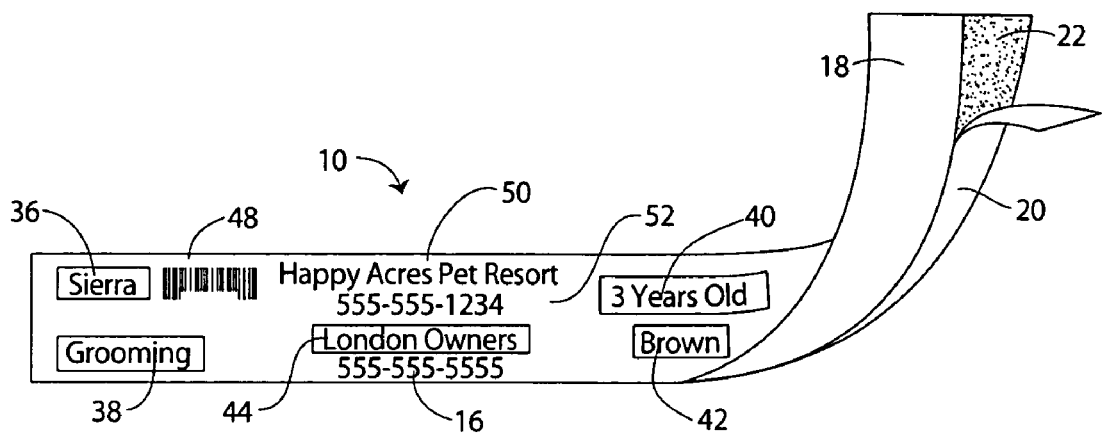
FIG. 1 is a perspective view of an animal identification band generated by an animal tracking system according to the present invention.
Figure 2:
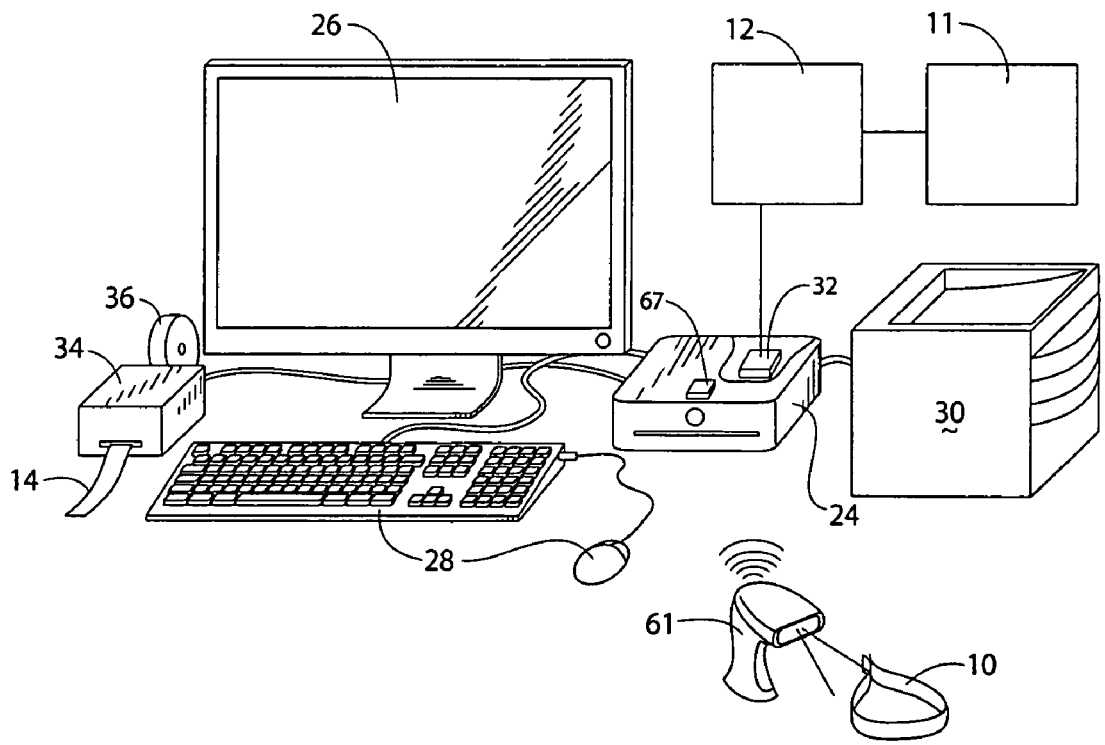
FIG. 2 illustrates schematically the animal tracking system integrated with a computerized animal management system in accordance with the present invention.

Referring now in more detail to the drawings in which like numerals refer to like parts throughout the several views, FIG. 1 illustrates in perspective view an animal identification band 10 according to the present invention generated by an animal identification band generator 11 that integrates with an animal management system 12 as illustrated in FIG. 2. The animal identification band 10 in the illustrated embodiment is an elongated narrow sheet or band 14 having a printing surface 16 and in the illustrated embodiment an opposing side 18 having a releasable cover 20 that overlies an adhesive surface 22.

With reference to FIG. 2, the animal management system 12 is a microprocessor-based computer system that operates on a conventional personal computer 24 having a microprocessor, a video terminal display 26, conventional input devices generally 28 including keyboard, mouse, and other operation control devices, and output devices generally 30 including printers and other document generating devices. The animal management system 12 maintains on a memory device 32 a database of information associated with each of a plurality of animals within the custody of an animal handling facility such as a kennel, veterinary, or other facility handling large gatherings of animals. A printer 34 prints the information from the database on a portion of a supply 35 of the strip material. A cutter incorporated within the printer 34 separates a length from the strip to form the animal identification band 10. With a printer 34 that lacks the cutter, the band 10 may be manually cut from the printer. The printer 34 in the illustrated embodiment is a CT400 printer available from SATCO America, Inc., of Charlotte, N.C., or an equivalent. The printer operates by a high speed processor and prints on thermal sensitive adhesive-backed media. Thermal transfer label media is also available from SATCO America, Inc. This media includes a general-purpose adhesive coated on paper face stock on a silicone coated paper carrier.

With continuing reference to FIG. 1, the print surface 16 on the animal identification band 10 displays information about a particular one of the animals within the custody of the animal handling facility. The information in the illustrated embodiment includes a name field 36, an activities field 38, an age field 40, and a description field 42. In addition, the information includes the owner name field 44 and contact phone number 46. The animal identification band 10 further includes an identification code 48, as well as the name of the animal handling facility 50 and phone number 52. The identification code 48 is a machine readable unique identifier associated with the particular animal. The identification code 48 is configured as a bar code, machine readable digits and symbols, or the like. It is within the scope of the present invention that the identification code 48 for a particular animal is read by a variety of electronic detectors, whereby the animal can be tracked for activities, as discussed below. It is to be appreciated that the coded identifier or identification code 48 may comprise an RFID tag that is attached to the band 10 or incorporated by the label manufacturer into the band material. Further, the print surface can be printed with other pet information in alternate embodiments, as selected by a facility using the present invention to meet particular needs, within the scope of the present invention.

Figure 3:
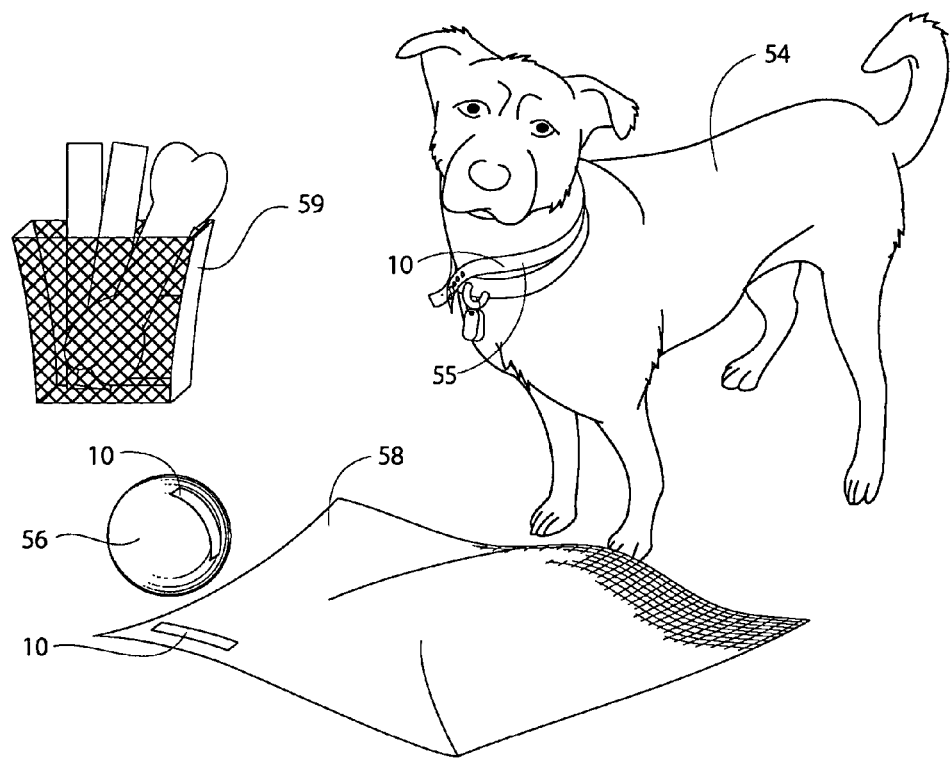
FIG. 3 is a perspective view illustrating use of the animal identification band shown in FIG. 1 for tracking animals and related articles.

FIG. 3 is a perspective view of an animal 54 wearing a collar 55 made with the animal identification band 10. This is accomplished by removing a portion of the cover 20 to expose the adhesive surface 22. The collar 55 is joined by overlapping an opposing distal end portion of the identification band with the adhesive surface 22. The animal identification band 10 also readily installs around a leg or paw of the animal, or around the body, as appropriate, such as at a veterinarians office for tracking animals undergoing surgery. In addition, the cover 20 can be removed completely and the animal identification band 10 attached to toys such as the ball 56, cushions and blankets 58, and supplies generally 59 brought by the owner of the animal to the animal handling facility. The bands 10 of a short length are readily attached to medications, owner-supplied food, pet treats, beds, runs, runs and run cards, report cards, grooming cages, dryers, and anywhere positive identification of the animal is needed.

FIG. 3 also illustrates a hand held scanner device 61 configured to detect 63 the identification code 48 on the band 10. The scanner device 61 communicate a signal 65 representative of the identification code 48 to a receiver/input device (see FIG. 1) that interacts with the animal management system 12 to track activities involving the animal. Such scanner device can be used at a veterinary service to confirm the identity of the animal prior to surgery.

Figure 4:
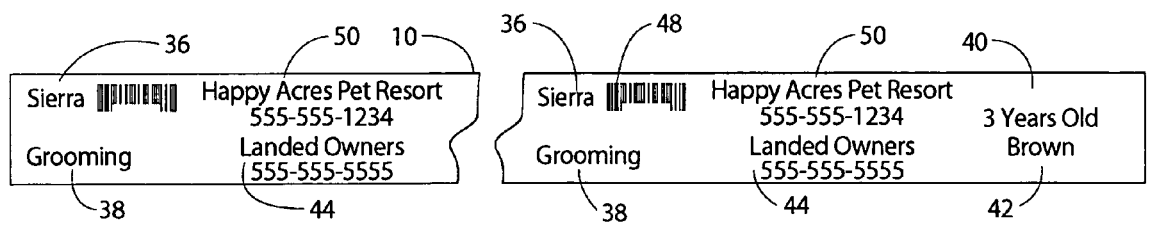
FIG. 4 is a plan view of an alternate embodiment of the animal identification band shown in FIG. 1.

FIG. 4 illustrates an alternate embodiment of the animal identification band 10. In this embodiment, the animal information printed on the print surface 16 is repeated along the length of the band 10. In this way, the information is generally readily available on sides of and about the animal when the animal identification band 10 is being used as a collar as illustrated in FIG. 3.

Figure 5:
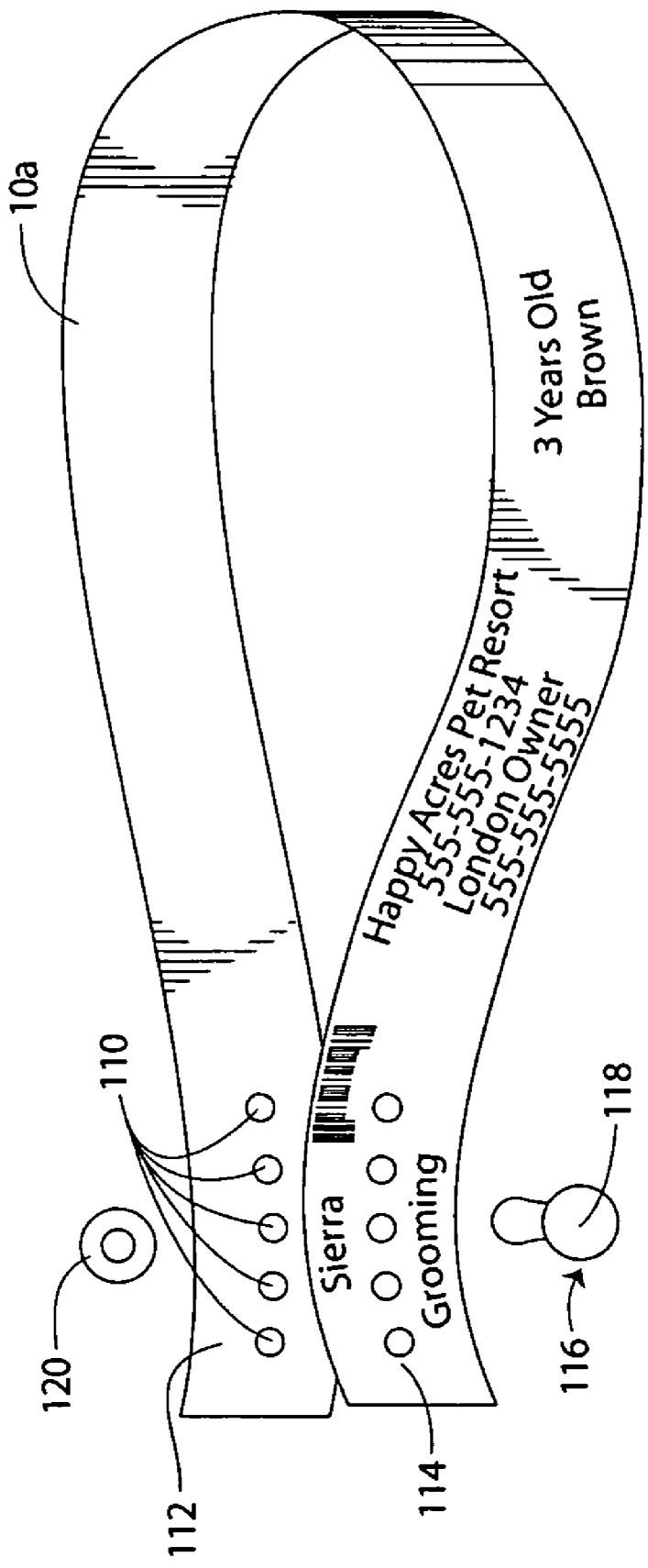
FIG. 5 illustrates in perspective view an alternate embodiment of the animal identification band shown in FIG. 1 for tracking animals.

FIG. 5 illustrates in perspective view an alternate embodiment of the animal identification band 10a, using a label supply that lacks the adhesive surface 22 and cover 20 opposing the printing surface 16. In this embodiment, opposing ends of the band 10a connect together by a fastener device. In the illustrated embodiment, the band 10a defines a plurality of holes 110 in leading and trailing end portions 112, 114. The holes 110 are spaced-apart, for example, holes 110 spaced-apart one-quarter (¼) inch over a two (2) inch leading and trailing portion. A button or fastener 1116 connects the opposing ends together. The fastener 116 has a male portion 118 that extends through aligned holes of the leading and trailing end, and engages a female portion 120 to secure the opposing ends of the band together. Other fasteners may be gainfully used, such as clips, hook-and-loop fasteners, or other fasteners having matingly engagable members.

Figure 6:
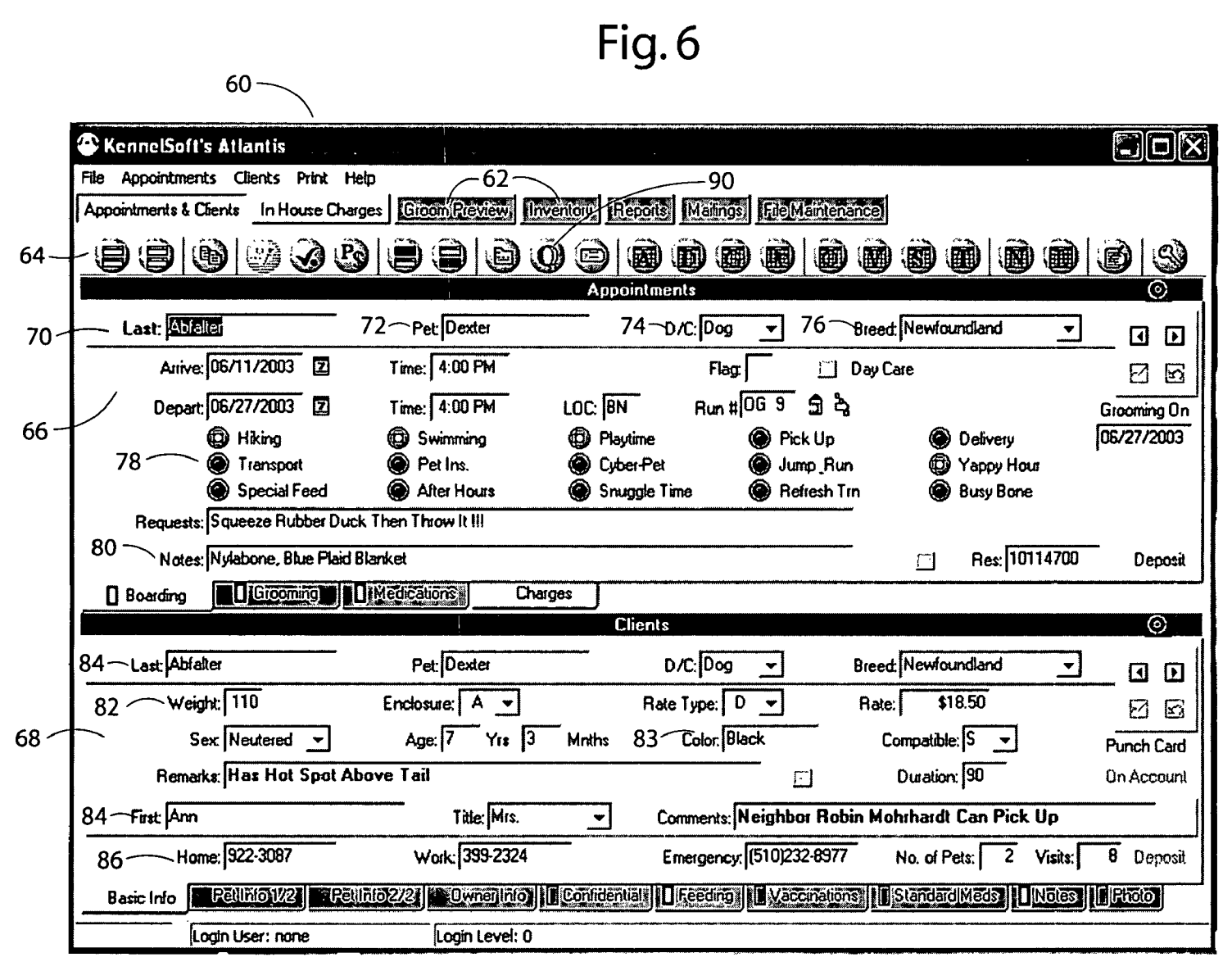

FIG. 6 is a representative check-in screen generated by the animal management system 12 used by an animal handling facility such as a pet kennel for checking in, tracking, and checking out a pet such as a dog or cat to be cared for at the pet care facility. Animal management computer systems are available commercially from various suppliers, and the exemplary screen shown in FIG. 6 is consistent with a data entry screen used in an animal management system provided by Kennelsoft Software Systems of Elk Rapids, Mich. Similar animal management systems configured for veterinary services are also available and the present invention readily integrates to such systems.

The display screen 60 includes management activity buttons 62 for accessing the various components of the animal management system. A field 64 of hot link buttons display symbols to facilitate user access and operation of the different tasks accomplished by the animal management system. An appointment section 66 includes fields for obtaining information about the pet to be cared for by the animal handling facility. A client section 68 provides for entering information about the owner of the pet. The appointments section 66 includes a last name field 70, pet name 72, type of animal 74 (dog or cat), and breed 76. The keyboard is used to enter text to the last name 70 and the pet name 72, while conventional drop-down menus are used to select information for the type and breed fields 74, 76. An activities field 78 includes a plurality of activities for the pet, and these are selected by positioning the mouse cursor within a selection button associated with each of the various activities. A notes field 80 is used for identifying articles brought with the pet to the pet care facility, such as a chewing bone, blanket, toy or the like, or other information about the pet.

The clients field 68 includes the animal weight 82, color 83, and other relevant information, including the name of the owner 84 and contact telephone numbers 86. The other information fields and functions of the animal management system are outside the scope of the present invention, but can be determined by reference to the users manual provided by Kennelsoft Software Systems.

Figure 7:
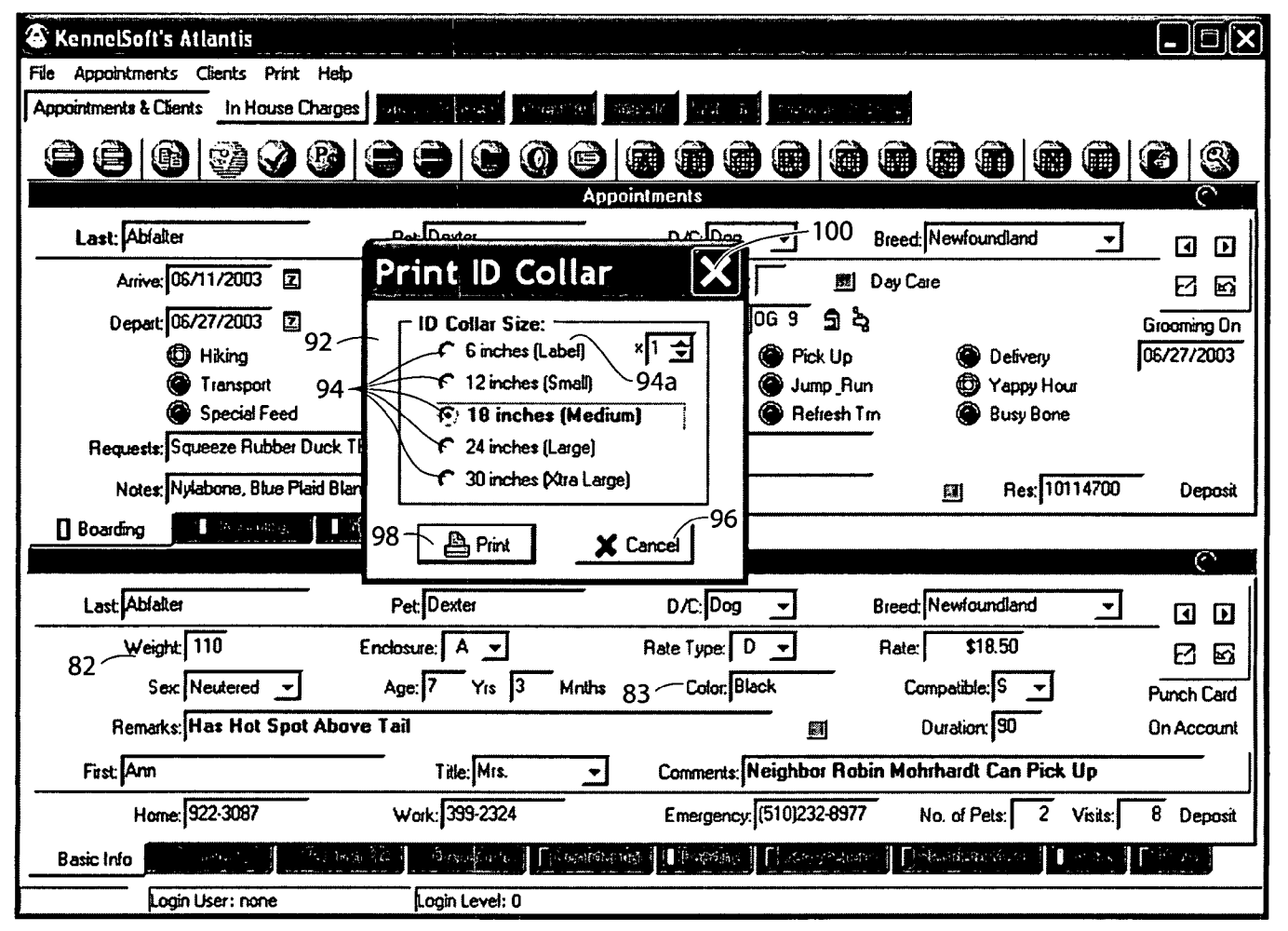

One activity link button 90 leads to operation of the animal identification collar generator, best illustrated in FIG. 7. The generator includes a window 92 for selecting and printing an animal identification band 10. In the illustrated embodiment, the window 92 includes selection options for five different lengths of the animal identification band. Each available length includes a selection button 94 and only one can be selected at a time. The window 90 also includes a cancel button 96 to exit from the band generator, a print button 98 to direct the printing of the band 10, and a close button 100 that closes the pop-up window 92. It is to be appreciated that an information entry system for receiving pet information such as name, description, and age, owner information such as owner name and contact phone number, and services information such as exercise, feeding, and grooming services, for generating an animal identification band, is a band generator integrated with an animal management system.

With reference to FIG. 6, the system generates the animal identification band 10 during check-in of the pet with the animal care facility. The pet name is entered in the pet name field 72. Generally, the "last" name for the pet is the last name of the owner which is entered in the last name field 70. The type of animal and breed are entered in the type and breed field 74 and 76. The activities are selected using the selection buttons in the activities field 78. Notes can be inserted in the notes field 80. The client information is entered to the system or verified during check-in for previous pet visitors to the animal control facility. This information includes the weight 82 and the color 83. The owner name 84 and contact information 86 is entered.

With reference to FIG. 7, one or more animal identification bands can be generated. For example, with reference to FIG. 3, a band 10 of a first length is generated for the neck collar 55, and shorter length bands 10 used as identification tags are generated for the ball 56 and the cushion 58. Using the button 90, the print identification band window 92 is displayed on the screen. The appropriate length of the band 10 is selected by activating the button 94. The print button is activated by the cursor using the mouse or other input device. The animal management system 12 transfers the information from the animal management database for printing on the print surface 16 of the animal identification band. In the illustrated embodiment, this includes the name 36, age 38, and coloring 42 of the pet. The activities selected for the pet are printed, together with the owner identification 44 and contact information 46. In the illustrated embodiment, the animal management system generates a coded identifier 48 which associates the particular pet with its records maintained by the animal management system on the pet information database. The elongated narrow sheet used to generate the animal identification band 10 is a consumable configured for receiving at least some information about the selected one of the animals within the custody of the animal handling facility.

The band 10 is readily wrapped about the pets neck, and the adhesive surface 22 is exposed and attached overlappingly to the opposing end of the band, to form the collar 55. For veterinary facilities performing surgery, the band 10 readily attaches about a leg, chest, or abdomen, providing clearance for a surgical area yet providing access around the animal for readily verifying identification prior to surgery or for animal handling facilities generally, prior to providing pet care services that require tracking of services and animal.

As discussed above, the animal identification band 10 readily forms into a loop for a collar or other encircling band for the pet. In reference to the alternate embodiment in FIG. 5, the band 10a forms into a loop by attaching the leading portion 112 to the trailing portion 114. This is accomplished in the illustrated embodiment by aligning one of the holes 110 at the leading portion 112 with one of the holes 110 at the trailing portion 114. The male portion 118 of the fastener 116 protrudes through the aligned openings and engages the female portion 120. Other fastener devices may likewise be used to secure the opposing ends together.

As noted above, the pet 55 in the example illustrated in FIG. 3 brought a cushion or blanket 58 and a toy 56. With reference to FIG. 7, the generate animal identification band button 90 can be activated once for each of the items brought with the animal as well as activated to generate a collar 55 for the animal. In the illustrated embodiment, a selection button 94a is configured to print a band 10 as a short "label" as indicated for attaching to an article brought with the pet. As shown in FIG. 3, bands 10 are generated to provide a label or band for each of the ball 56, the blanket 58, the accessories and supplies 59, and the neck collar 55 for the animal.

In an alternate embodiment, the animal identification band 10 is generated automatically for a collar by referencing the breed field 76. Each of the breeds is associated with one of the available lengths of animal identification bands. Thus when the final piece of information selected for display on the animal identification band is entered to the system, the system can generate automatically a collar cut to an appropriate length for the particular type of breed.

The identification of the animal can be verified before administration of medicine, undertaking surgery, engaging in an activity, feeding, or grooming, or for other tracking purposes where identification is important. The identification code 48 is used by the scanner devices 61 to communicate activity information and pet information to the database, for tracking activities and services provided by the animal handling facility.

As described herein, the present invention integrates readily with animal management systems used by animal handling facilities including kennels, pet care sites, veterinary facilities, and other animal care and handling facilities.

This specification has described the present invention that provides an integrated animal identification band for an animal management system, including the steps necessary for making and using various embodiments thereof. It is to be understood, however, that numerous changes and variations may be made in the construction of the present hard cover product within the spirit and scope of the present invention, and that modifications and changes may be made therein without departing from the scope thereof as set forth in the appended claims.

What is claimed is:

1. A pet animal tracking system for a pet-care facility that provides pet-care grooming and pet-sitting services integrated with a computerized pet animal management system, which pet animal tracking system generates animal identification bands for wearing by pet animals within the custody of the pet-care facility, comprising:
　a pet animal management system operated by a microprocessor that maintains an animal information database of information associated with each of a plurality of pet animals within the custody of a pet-care facility;
　an animal label driver operatively engaged to the pet animal management system for selectively generating an animal identification band for a selected one of the pet animals within the custody of the pet-care facility, the animal identification band wearable by the pet animal during its custody by the pet-care facility and disposable after use comprising a sheet having an information display surface;
　an attacher for connecting the animal identification band to itself in association with the selected one of the pet animals;
　a printer operated by the animal label driver to print at least an identification code associated with the selected one of the pet animals on the information display surface of the animal identification band so that each pet animal is distinguished from other of the pet animals,
　whereby the animal identification band attaches in a selected position in association with the selected pet animal by the attacher.

2. The animal tracking system as recited in claim 1, wherein the animal identification band is separated at a selected length from a roll of media suitable for printing by the printer.

3. The animal tracking system as recited in claim 1, wherein a supply of the animal identification bands is continuous; and further comprising a cutter to separate the animal identification band at a selected length.

4. The animal tracking system as recited in claim 1, wherein the animal information associated with the selected pet animal includes the identification code, an owner identifier associated with a person who owns the pet animal, and a services identifier that details animal care services to be provided by the pet-care facility, which animal information is printed by the printer on the animal identification band for tracking delivery of animal care services.

5. The animal tracking system as recited in claim 1, wherein the animal information database includes an animal type associated with each pet animal; and the animal identification band is cut to a length based on the animal type for the selected pet animal.

6. The animal tracking system as recited in claim 1, wherein the attacher comprises an opposing side of the animal identification band having a releasable cover overlying an adhesive surface, whereby the animal identification band attaches by exposing a portion of the adhesive surface.

7. The animal tracking system as recited in claim 6, wherein the animal identification band forms a collar attached about a neck portion of the selected pet animal by adhering an uncovered portion of the adhesive surface to a portion of the releasable cover on the opposing side of the animal identification band.

8. The animal tracking system as recited in claim 1, wherein the attacher comprises a fastener and the animal identification band defines a plurality of holes in leading and trailing portions thereof, and joined together in a loop by the fastener extending through aligned holes.

9. The animal tracking system as recited in claim 1, wherein the animal information to be printed on the information display surface further comprises a name of the selected pet animal, information as to medicine to be communicated by the pet-care facility to the selected pet animal, and at least one activity for the selected pet animal.

10. The animal tracking system as recited in claim 9, wherein the activity comprises exercise information, grooming, and veterinary services, to be provided by the pet-care facility for the selected pet animal.

11. The animal tracking system as recited in claim 1, wherein the identification code comprises an encoded identifier that is readable by an electronic sensor for tracking the activities and services provided to the selected pet animal by the pet-care facility.

12. The animal tracking system as recited in claim 11, further comprising a communicator that communicates the identification of the encoded identifier detected by the electronic sensor to the animal information database to maintain a record of the activities and services.

13. The animal tracking system as recited in claim 1, wherein the information as to the selected pet animal is printed in sequential repeated blocks on the length of the animal identification band, whereby the animal information is readily observable.

14. A method of tracking a pet animal within the custody of a pet-care facility that provides pet-care grooming and pet-sitting services and having a computerized animal management system with an integrated animal tracking system that generates identification bands for pet animals within the custody of the pet-care facility, comprising the steps of:
　(a) providing an animal label driver for an animal management system operated by a microprocessor to maintain an animal information database of a plurality of pet animals within the custody of a pet-care facility;
　(b) selectively printing by the animal label driver an animal identification band comprising an elongated sheet having an information display surface printed with at least an identification code from the animal information database associated with a selected one of the pet animals within the custody of the pet-care facility; and
　(c) attaching the animal identification band to itself in a selected position in association with the selected pet animal for wearing as a collar during its custody by the pet-care facility and disposal after use.

15. The method as recited in claim 14, further comprising prior to step (b) the step of providing the animal identification band from a supply to a printer.

16. The method as recited in claim 14, wherein step (c) comprises attaching the animal identification band about a portion of the selected animal.

17. The method as recited in claim 16, wherein the step of attaching comprises connecting a fastener together to hold opposing end portions of the animal identification band together.

18. The method as recited in claim 14, wherein the step of attaching comprises removing at least a portion of a releasable cover overlying an adhesive surface on the animal identification band and attaching the adhesive surface to a portion of the animal identification band.

19. The method as recited in claim 14, further comprising the step of reading at least some of the information on the information display surface prior to delivery of services to the selected animal.

20. The method as recited in claim 14, further comprising the step of using an electronic reader to read the identification code printed on the animal identification band, said reader communicates the identification code to the animal identification database.

21. A consumable for use with a printer in an animal tracking system integrated with a computerized animal management system, which animal tracking system generates an animal identification band for one of a plurality of pet animals within the custody of a pet-care facility that provides pet-care grooming and pet-sitting services, comprising an elongated sheet having an information display surface and an opposing side having a releasable cover overlying an adhesive surface, the consumable engaged by a printer operated by an animal label driver that communicates with the computerized animal management system for selectively generating an animal identification band by printing with the printer on the information display surface at least an identification code associated with a selected one of the pet animals within the custody of the pet-care facility, the animal management system operated by a microprocessor that maintains an animal information database of one or more pieces of information associated with each of a plurality of pet animals within the custody of the pet-care facility, whereby the animal identification band attaches to itself in association with the selected one of the pet animals during its custody by the pet-care facility and disposable after use by removing at least a portion of the cover sheet to expose a portion of the adhesive surface for attaching.

* * * * *